(No Model.)

C. S. SHEPPARD.
LUGGAGE CARRIER.

No. 600,238. Patented Mar. 8, 1898.

WITNESSES:
G. B. Thompson
Janet McDw

Charles S. Sheppard INVENTOR

BY
C. R. Patterson & Son.
ATTORNEY

UNITED STATES PATENT OFFICE.

CHARLES S. SHEPPARD, OF WEST PITTSTON, PENNSYLVANIA.

LUGGAGE-CARRIER.

SPECIFICATION forming part of Letters Patent No. 600,238, dated March 8, 1898.

Application filed August 18, 1896. Serial No. 603,152. (No model.)

*To all whom it may concern:*

Be it known that I, CHARLES S. SHEPPARD, a citizen of the United States, residing at West Pittston, in the county of Luzerne and State of Pennsylvania, have invented certain new and useful Improvements in a Combination-Handle for Lunch-Pails or Bundles for Attaching to Bicycles or other Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in means of attaching a lunch-can or package to bar of a bicycle or other vehicle; and it consists of a bail or handle hung to the pail or can or to a plate to which may be attached straps or other device for receiving a bundle or package, with curves in the form of hooks to hook over the bar of a bicycle or other vehicle, and a spring operating under the bar to hold it in place.

Figure 1:
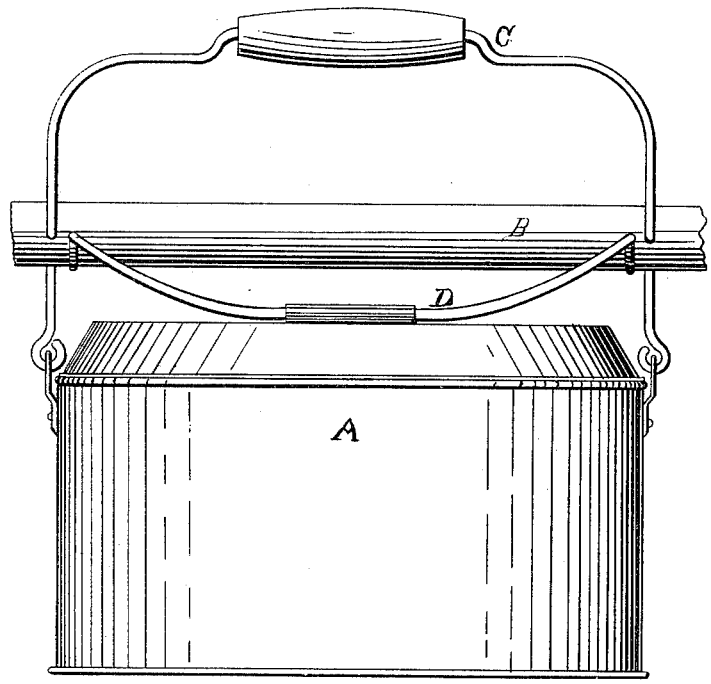
Figure 2:
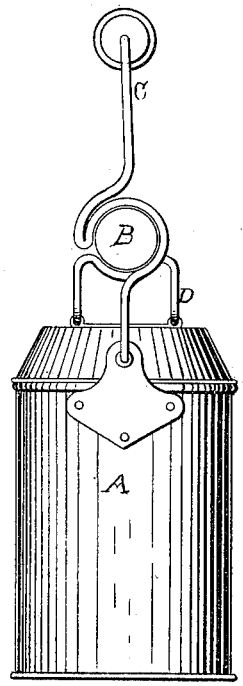
Figure 3:
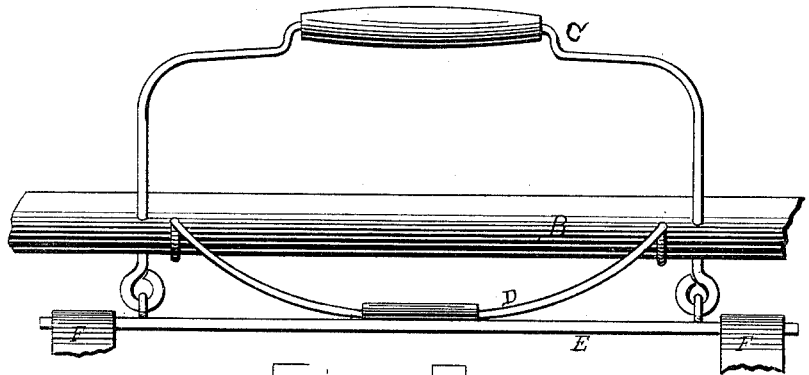

Figure 1 represents the device attached to a lunch-can A and the bar of a bicycle or other vehicle B. Fig. 2 represents an end view of the device. Fig. 3 represents the device attached to the plate of a shawl-strap or luggage-carrier.

A represents the lunch-can.

B represents the bar of the bicycle or other vehicle to which the device is attached.

C represents the bail, which is made with a bend in each side to hook over the bar.

D represents a spring fastened on the top of the can A or the plate E and which presses up against the bar B, while the bail C is hooked over the top, and thus it is held firmly in place.

F F represent straps attached to the plate E for fastening the device to a bundle or package.

To attach the device to the bar of a bicycle or other vehicle, the bail is turned down and the package with the spring is brought up against the bar, so that the spring is pressed down far enough to allow the hooks on the bail to pass over the bar, where it will be held firmly in place. The wire of which the hooks and spring are made may be covered with cloth or other soft material to prevent the hooks and spring from marring the finish of the bar to which the device is attached.

Having thus fully described my invention, what I claim as new, and wish to secure by Letters Patent, is—

1. The combination of a lunch can or box with a bail with downward-curved hook or hooks, in combination with a spring or springs arranged to press up against the bar of a bicycle or other vehicle to hold it while the curved bail is hooked over the said bar, all substantially as and for the purpose shown and described.

2. The combination of a bail with downward-curved hook or hooks attached to a luggage-carrier with a spring or springs arranged to bear up under the bar of a bicycle or other vehicle, to hold it in place, all substantially as shown and described.

In testimony whereof I affix my signature in presence of two witnesses.

CHARLES S. SHEPPARD.

Witnesses:
C. R. PATTERSON,
E. B. PATTERSON.